United States Patent
Nakamura et al.

[11] Patent Number: 6,160,855
[45] Date of Patent: Dec. 12, 2000

[54] DIGITAL MODULATION METHOD AND DIGITAL COMMUNICATION SYSTEM

[75] Inventors: Kenzou Nakamura; Kazuyoshi Tari; Takao Yokoshima, all of Omiya, Japan

[73] Assignee: Mitsubishi Materials Corporation, Tokyo, Japan

[21] Appl. No.: 09/019,722

[22] Filed: Feb. 6, 1998

[30] Foreign Application Priority Data

Feb. 6, 1997 [JP] Japan ................................ 9-024064

[51] Int. Cl.$^7$ ................................................ H04L 27/00
[52] U.S. Cl. ...................... 375/280; 375/259; 332/103; 329/304
[58] Field of Search ..................... 375/259, 279, 375/280, 284, 300, 329, 331, 281; 332/103–105; 329/304–310

[56] References Cited

U.S. PATENT DOCUMENTS

| | | | |
|---|---|---|---|
| 5,402,272 | 3/1995 | Nakatsu et al. | 360/39 |
| 5,663,691 | 9/1997 | Kowalik et al. | 332/103 |
| 5,705,958 | 1/1998 | Janer | 332/103 |
| 5,740,204 | 4/1998 | Nagashima | 375/341 |
| 5,841,815 | 11/1998 | Takizawa | 375/326 |

*Primary Examiner*—Chi H. Pham
*Assistant Examiner*—Bryan Webster
*Attorney, Agent, or Firm*—Oblon, Spivak, McClelland, Maier & Neustadt, P.C.

[57] ABSTRACT

A digital communication method and system wherein in response to input 3-bit data, a phase and amplitude of a carrier signal are controlled so that a symbol at a given time is located at one of allowed signal points depending on the content of the symbol. The allowed signal points include six signal points where a phase shift equal to $\pm\pi/4$, $\pm 2\pi/4$, or $\pm 3\pi/4$ occurs relative to the signal point at which the immediately previous symbol was located and where the amplitude is equal to a first level, and also include two signal points where a phase shift equal to $\pm 2\pi/4$ occurs relative to the signal point at which the immediately previous symbol was located and where the amplitude is equal to a second level lower than the first level. The digital communication method and system allows for a transmitter which does require a high-performance power amplifier, and a simplified receiver circuit. In addition, high-speed transmission can be achieved without expanding the bandwidth and high-reliability transmission is possible even in an environment having bad radio wave propagation as is the case in mobile communication.

13 Claims, 7 Drawing Sheets

DIGITAL MODULATION METHOD AND DIGITAL COMMUNICATION SYSTEM

CROSS REFERENCES TO RELATED APPLICATIONS

The present invention claims priority to priority document no. Hei 94024064 filed in Japan on Feb. 6, 1997, and incorporated by reference herein.

BACKGROUND OF THE INVENTION

1. Field of the Invention

The present invention relates to a digital modulation/demodulation method and system suitable for use in a mobile communication system and also in a digital communication device.

2. Description of the Related Art

In recent years, π/4-shift quadrature phase shift keying (QPSK) has developed as a digital modulation technique having high resistance to disturbance such as fading and thus is suitable for use in a mobile communication system. The π/4-shift QPSK technique is a QPSK technique in which a carrier signal takes one of four phase shift states assigned to 2-bit digital data thereby transmitting desired information.

Referring to FIGS. 10a and 10b, signal locations in QPSK and π/4-shift QPSK will now be described. FIGS. 10a and 10b are signal space diagrams illustrating modulated signals in polar coordinates for QPSK and π/4-shift QPSK. In these figures, the vertical axes Q and the horizontal axes I represent the quadrature and inphase components, respectively, of the modulated signal. Hereinafter, points plotted in the signal space diagram are referred to as signal points.

In QPSK, there are four signal points having a phase difference ±π/4 or ±3π/4 relative to the carrier signal, wherein these four points correspond to respective 2-bit digital data. That is, in QPSK, there are four different symbols or discrete states which can be taken by a signal during a predetermined time period. Furthermore, in QPSK, the phase difference between successive symbols can be 0, ±π/2, or π. For example, in FIG. 10a, when a symbol is assumed to be at a signal point a, at a certain symbol time, the transitions denoted by arrows in the figure are possible depending on the data to be transmitted. That is, (i) if the data to be transmitted at the following symbol time is equal to "00", then a transition to the signal point a occurs (no change occurs in the phase in this case); however, (ii) if the data to be transmitted at the following symbol time is equal to "01", then a transition to the signal point b occurs; (iii) if the data to be transmitted at the following symbol time is equal to "10", then a transition to the signal point c occurs; and (iv) if the data to be transmitted at the following symbol time is equal to "10", then a transition to the signal point d occurs; and thus corresponding changes in phase occur.

On the other hand, in π/4-shift QPSK, the phase difference between successive symbols can be ±π/4 or ±3π/4. For example, in FIG. 10b, if a symbol is at a signal point a' at a certain symbol time, the transitions denoted by arrows in the figure are possible depending on the data to be transmitted. That is, if the data to be transmitted at the following symbol time is "00", then a transition to the signal point a' occurs. Similarly, a transition to the signal point b' occurs for the symbol "01", to the signal point c' for the symbol "11", and to the signal point d' for the symbol "10", and thus corresponding changes in phase occur.

In π/4-shift QPSK, as described above, transitions occur at each symbol time alternately between points denoted by ○ and ● in FIG. 10b. This means that although π/4-shift QPSK includes eight apparent signal points in the signal space, the phase states which can be taken at the subsequent symbol time are limited to four states and thus each symbol transmits 2-bit information.

In the π/4-shift QPSK technique described above, as can be seen from FIG. 10b, any transition occurs without passing through the origin of the signal space. This results in a reduction in the variation in the envelope amplitude of the modulated signal, and therefore, it is possible to suppress nonlinear distortion which would otherwise occur in power amplification in a communication device. In the π/4-shift QPSK technique, unlike the QPSK technique, even when the same data is transmitted successively, a phase change of π/4 radians occurs for each transmission of the data. This means that the phase of the modulation signal always changes and thus the π/4-shift QPSK technique has the advantage that the timing can be easily extracted from the signal.

Amplitude phase shift keying (APSK) is also a known digital modulation technique. In APSK, two parameters, namely the amplitude and phase of a carrier signal are modulated in accordance with the value of digital data to be transmitted. For example, signal locations for 16-QAM (quadrature amplitude modulation) are shown in the signal space diagram of FIG. 11. As can be seen, in multilevel digital modulation techniques such as 16-QAM in which both phase and amplitude are modulated, symbols (denoted by ● in FIG. 11) are located in the signal space such that they are uniformly spaced by an equal Euclidean distance.

Such signal locations are obtained, for example, if sinusoidal signals which differ in phase by 90° from each other are subjected to 4-level ASK modulation according to 2-bit data, respectively, and if the resultant two modulated signals are added together. Thus, in 16-QAM, each symbol is represented by 4-bit data. As a result, 16-QAM can transmit information at a high data transmission rate compared to QPSK and π/4-shift QPSK.

In multilevel digital modulation techniques such as 16-QAM, in order to make it possible to determine the levels of symbols having an equal phase, it is required to place preamble signals (denoted by ○ in FIG. 11) at predetermined time intervals so that the amplitude of the received signal can be evaluated relative to the amplitude of the preamble signals.

A problem of the π/4-shift QPSK is that when data is transmitted at a high transmission rate, the occupied bandwidth increases with the transmission rate, and thus it becomes impossible to use the frequency band in an efficient fashion. To achieve high-speed data transmission, if APSK (amplitude phase shift keying) is performed in a multilevel fashion, a greater dynamic range of the signal amplitude is required. The increase in the dynamic range can result in nonlinear distortion when the signal is amplified by a transmission power amplifier. To avoid such distortion, it is required that the power amplifier should have good linearity over a wide dynamic range. However, such a power amplifier needs a greater operating current and thus the power efficiency becomes poor.

Furthermore, the multilevel APSK signal has a small Euclidean distance among symbols. That is, when symbols are plotted in a polar-coordinate signal space, they are spaced by a small distance. This means that the multilevel APSK signal has poor resistance to fading and noise, and thus an additional circuit is required at a receiving end to compensate for such effects, especially when the multilevel APSK technique is employed in applications in which communication devices move at a high speed. As can be understood from the above discussion, although the multilevel APSK can be employed to achieve high-speed data transmission in an environment where good radio wave propagation is obtained, the error rate becomes high when it is employed in a bad environment in terms of the radio wave propagation in which disturbance such as multipath fading occurs, as is the case in mobile applications. The increase in the error rate causes the effective transmission rate to decrease to a level nearly equal to or even lower than the low transmission speed obtained in π/4-shift QPSK.

Furthermore, if preamble signals are inserted, as described above with reference to 16-QAM, in a transmission signal at fixed time intervals so that the amplitude of the received signal is evaluated with reference to the amplitude of the preamble signals, a mobile communication system employing such a technique will encounter the following problems:

(1) When a great variation occurs in the intensity of a radio wave within a preamble signal interval, there will be a high possibility that an error occurs in detection of ASK signals (refer to FIG. 12, in which shaded regions denote preamble signals);

(2) If the preamble signal interval is set to a smaller value so as to suppress the influence of fading which occurs at short time intervals, then the amount of information which can be transmitted decreases by a corresponding amount (refer to FIG. 13).

SUMMARY OF THE INVENTION

Accordingly, one object of the present invention to provide a digital modulation method and a digital communication device in which (i) a transmitter does not need high performance in its power amplifier; (ii) a receiver can be realized with a simple circuit; (iii) high-speed transmission can be achieved without expanding the bandwidth; and (iv) high-reliability transmission is possible even in an environment having bad radio wave propagation, as is the case in mobile communication.

It is another object of the present invention to provide a digital modulation method and a digital communication device which do not need preamble signals, unlike conventional multilevel digital modulation technique in which both phase and amplitude are modulated, thereby ensuring that data is transmitted and received with high reliability and in a highly efficient fashion even in an environment including fading.

According to a first aspect of the present invention, there is provided a digital modulation method based on amplitude phase shift keying, characterized in that signal points at which symbols represented by the digital signal are located include such signal points where the signal has a phase modulation component and has a constant amplitude; and signal points obtained by adding an amplitude modulation component to the phase modulation component at some of the former signal points. The term "phase modulation" is used herein to describe not only digital phase shift keying (PSK) in which the phase is modulated in accordance with the symbol, but also differential phase shift keying (DPSK) in which a phase transition always occurs in the modulation process.

According to a second aspect of the present invention, there is provided a method for demodulating a modulated signal obtained by the digital modulation method according to the first aspect of the invention, the method being characterized in that when the modulated signal is received, the amplitude level of symbols including only a phase modulation component and having no amplitude modulation component is used as a reference level to determine the amplitude level for such symbols having a phase at which an amplitude modulation component is also included in the modulated signal.

According to a third aspect of the invention, there is provided a digital modulation method based on amplitude phase shift keying, for modulating a carrier signal depending on n-bit information (where n is an integer equal to or greater than 3), the method being characterized in that $2^n$ symbols representing the n-bit information are located in a two-dimensional signal space representing the amplitude and the phase of symbols in such a manner that the minimum Euclidean distance between signal points where symbols have a "0" at a certain bit and signal points where symbols have a "1" at the same bit has a greater value when the bit is weighted by a greater factor than when the bit is weighted by a smaller factor.

According to a fourth aspect of the invention, there is provided a digital modulation method based on the third aspect, wherein of a plurality of groups including symbols having equal value at a particular one bit of the n bits, such a group having the smallest Euclidean distance among adjacent symbols is inhibited to be used depending on the degree of degradation in the communication quality due to noise, fading, reduction in the intensity of electric field, or the like, and information is transmitted using n−1 bits; and depending on the degree of degradation in the communication quality, the above process is performed repeatedly for the remaining symbols except for the symbols inhibited to be used, thereby transmitting n−k bit information (wherein k is an integer greater than 1 and smaller than n).

According to a fifth aspect of the invention, there is provided a digital modulation method based on the third or fourth aspect, wherein the value of n is equal to 3 and a symbol at any given time is located at a symbol position selected from the group consisting of a first symbol position having a phase different by +π/4 relative to that of the symbol position at one symbol previous time and having an amplitude equal to a first level; a second symbol position having a phase different by −π/4 relative to that of the symbol position at one symbol previous time and having an amplitude equal to the first level; a third symbol position having a phase different by +3π/4 relative to that of the symbol position at one symbol previous time and having an amplitude equal to the first level; a fourth symbol position having a phase different by −3π/4 relative to that of the symbol position at one symbol previous time and having an amplitude equal to the first level; a fifth symbol position having a phase different by +2π/4 relative to that of the symbol position at one symbol previous time and having an amplitude equal to the first level; a sixth symbol position having a phase different by −2π/4 relative to that of the symbol position at one symbol previous time and having an amplitude equal to the first level; a seventh symbol position having a phase different by +2π/4 relative to that of the symbol position at one symbol previous time and having an amplitude equal to a second level lower than the first level; and an eighth symbol position having a phase different by −2π/4 relative to that of the symbol position at one symbol previous time and having an amplitude equal to the second level.

According to a sixth aspect of the invention, there is provided a digital modulation method based on the fifth aspect, wherein the second level is determined so that the Euclidean distance from the seventh symbol position to the first and third symbol positions and that from the eighth symbol position to the second and fourth symbol positions are equal to the Euclidean distance from the fifth symbol position to the first and third symbol positions and that from the sixth symbol position to the second and fourth symbol positions, respectively.

According to a seventh aspect of the invention, there is provided a digital communication device for transmitting and receiving digital data by performing discrete amplitude phase shift keying modulation and demodulation on a carrier signal in accordance with successively input digital data, the device including conversion means for converting the digital data to 3-bit parallel data; and modulation means for changing the phase and the amplitude of the modulated signal at a given time according to the 3-bit parallel data produced by the conversion means, in such a manner that the phase and amplitude are in one of states selected from the group consisting of a first state having a phase different by +π/4 relative to that in a state at one symbol previous time and having an amplitude equal to a first level; a second state having a phase different by −π/4 relative to that in the state at one symbol previous time and having an amplitude equal to a first level; a third state having a phase different by +3π/4 relative to that in the state at one symbol previous time and having an amplitude equal to a first level; a fourth state having a phase different by −3π/4 relative to that in the state at one symbol previous time and having an amplitude equal to a first level; a fifth state having a phase different by +2π/4 relative to that in the state at one symbol previous time and having an amplitude equal to a first level; a sixth state having a phase different by −2π/4 relative to that in the state at one symbol previous time and having an amplitude equal to a first level; a seventh state having a phase different by +2π/4 relative to that in the state at one symbol previous time and having an amplitude equal to a second level lower than the first level; and an eighth state having a phase different by −2π/4 relative to that in the state at one symbol previous time and having an amplitude equal to the second level.

According to an eighth aspect of the invention, there is provided a digital communication device based on the seventh aspect, wherein the conversion means fixes a particular bit of the 3-bit parallel data, to be output, at a particular value so that the modulated signal is always in either one of state from first to fourth state depending on the degree of degradation in the communication quality due to noise, fading, reduction in the intensity of electric field, or the like. Furthermore, the conversion means converts successively-input digital data to 2-bit parallel data and then combines the 2-bit parallel data with the particular bit fixed to the particular value, and finally outputs the resultant data as the 3-bit parallel data.

According to a ninth aspect of the invention, there is provided a digital communication device based on the eighth aspect, wherein the conversion means fixes a particular bit of the 3-bit parallel data, to be output, at a particular value so that the modulated signal is always in either the first or fourth state, or in either the second or third state, or in either the fifth or sixth state, depending on the degree of degradation in the communication quality due to noise, fading, reduction in the intensity of electric field, or the like. Furthermore, the conversion means fixes a particular bit of the remaining two bits at a particular value, and the conversion means converts successively-input digital data to 1-bit data and then combines the 1-bit data with the particular two bits fixed to the particular values, and finally outputs the resultant data as the 3-bit parallel data.

According to a tenth aspect of the invention, there is provided a digital communication device based on any of seventh to ninth aspects, wherein the modulation means includes carrier signal generation means for generating a carrier signal; storage means for storing information representing the phase difference of the current modulated signal relative to the phase of the carrier signal; phase amplitude indication means for selecting one of state from the first to eighth states in accordance with the values of respective bits of the 3-bit parallel data output from the conversion means, and then determining the phase difference of the modulated signal relative to the phase of the carrier signal from the phase change in the selected state and from the information stored in the storage means, and finally indicating the phase difference determined and the amplitude in the selected state; information updating means for updating the information about the phase difference stored in the storage means to the phase difference indicated by the phase amplitude indication means; and phase amplitude control means for controlling the phase and the amplitude of the carrier signal so that the phase and amplitude of the carrier signal has a phase difference and an amplitude equal to the phase difference and the amplitude indicated by the phase amplitude indication means.

According to an eleventh aspect of the invention, there is provided a digital communication device based on the tenth aspect, wherein the phase amplitude indication means performs first selection for selecting either a group including the first, third, fifth and seventh states or a group including the second, fourth, sixth and eighth states, in accordance with the value of a predetermined bit of three bits of the 3-bit parallel data output from the conversion means; second selection for selecting, after the first selection, in accordance with the value of a predetermined bit of the remaining two bits of the three bits in such a manner that if the group including the first, third, fifth, and seventh states is selected in the first selection, then either a group including the first and third states or a group including the fifth and seventh states is selected in the second selection, while either a group including the second and fourth states or a group including the sixth and eighth states is selected in the second selection if the group including the second, fourth, sixth, and eighth states is selected in the first selection; and third selection for selecting, after the second selection, either one of the two states included in the group selected in the second selection in accordance with the value of the remaining one bit of the three bits.

According to a twelfth aspect of the invention, there is provided a digital communication device based on the eleventh aspect, wherein if the amplitude indicated by the phase amplitude indication means is the first level then the phase amplitude control means controls the amplitude of the modulated signal so that it becomes equal to the level of the carrier signal, while the phase amplitude control means controls the amplitude of the modulated signal so that it becomes equal to a value 2½−1 times the amplitude of the carrier signal if the amplitude indicated by the phase amplitude indication means is the second level.

According to a thirteenth aspect of the invention, there is provided a digital communication device based on any of seventh to twelfth aspects, including receiving means for receiving the modulated signal output from the modulation means; detection means for performing envelope detection on the modulated signal received via the receiving means; phase difference detection means for detecting the phase difference between successive symbols; and demodulation means for demodulating the modulated signal into 3-bit digital data in accordance with the level of the detected signal output from the detection means and the phase difference detected by the phase difference detection means. The demodulation means determines the value of one bit of the three bits depending on whether the phase difference detected by the phase difference detection means is positive or negative; the value of one bit of the remaining two bits depending on whether the phase difference detected by the phase difference detection means is equal to any of $\pm\pi/4$ and $\pm 3\pi/4$; and the value of the remaining one bit in such a manner that if the phase difference detected by the phase difference detection means is equal to any of $\pm\pi/4$ and $\pm 3\pi/4$, the value of the remaining one bit is determined in accordance with the phase difference, while the value of the remaining one bit is determined in accordance with the detection result of the detection means in the case where the phase difference detected by the phase difference detection means is not equal to any of $\pm\pi/4$ and $\pm 3\pi/4$.

BRIEF DESCRIPTION OF THE DRAWINGS

A more complete appreciation of the invention and many of the attendant advantages thereof will be readily obtained as the same becomes better understood by reference to the following detailed descriptions when considered in connection with the accompanying drawings, wherein:

FIGS. 7a and 7b are block diagrams illustrating the details of the receiver shown in FIG. 6, wherein FIG. 7a illustrates a frequency converter and FIG. 7b illustrates a signal demodulator;

FIGS. 9a and 9b are block diagrams illustrating the details of the signal demodulator shown in FIG. 7b, wherein FIG. 9a illustrates an AM demodulator and FIG. 9b illustrates a DPSK demodulator;

DESCRIPTION OF THE PREFERRED EMBODIMENTS

Figure 1A:
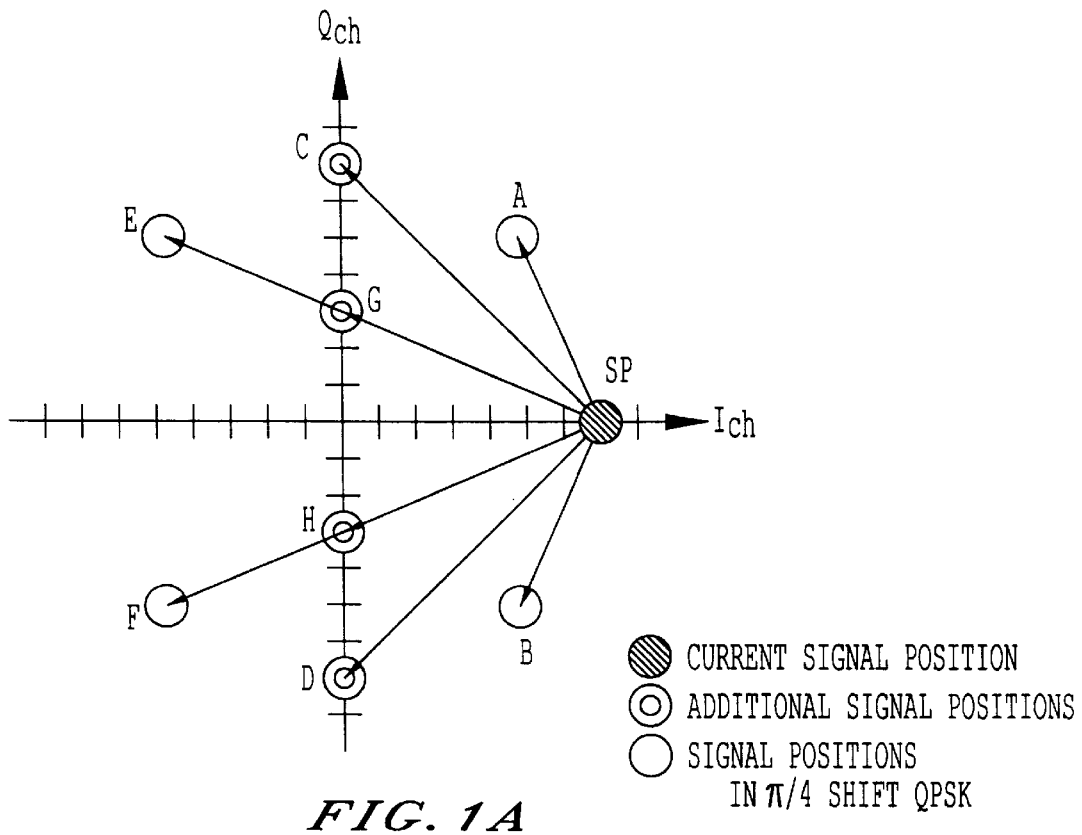
FIGS. 1a and 1b are a signal space diagrams illustrating the constellations used in a digital communication system according to an embodiment of the present invention.

Referring now to the drawings, wherein like reference numerals designate identical or corresponding parts throughout the several views, and more particularly to FIG. 1 thereof, there is illustrated the manner in which symbols are located according to an embodiment of a digital modulation method or digital communication device of the invention.

In the following description, by way of example, the locations of 2 symbols representing 3-bit information are shown. In the digital modulation method and the digital communication device according to the present embodiment of the invention, APSK is performed such that the phase and the amplitude change from symbol to symbol as follows.

First, signal points are placed at locations where the phase change between successive symbols is equal to either $\pm\pi/4$, $\pm 2\pi/4$, or $\pm 3\pi/4$. Furthermore, additional ASK signal points are placed at locations where the phase change is equal to $\pm 2\pi/4$. Furthermore, (i) the Euclidean distance from the signal point having a phase change of $\pm 2\pi/4$ to the signal points having a phase difference of $+\pi/4$ or $+3\pi/4$, are equal to the Euclidean distance from the previously located signal point having a phase change of $+2\pi/4$ to the signal points having a phase difference of $+\pi/4$ or $+3\pi/4$, and (ii) the Euclidean distance from the signal point having a phase change of $-2\pi/4$ to the signal points having a phase difference of $-\pi/4$ or $-3\pi/4$ are equal to the Euclidean distance from the previously located signal point having a phase change of $-2\pi/4$ to the signal points having a phase difference of $-\pi/4$ or $-3\pi/4$.

The signal locations are described in further detail below with reference to the signal space diagrams shown in FIGS. 1a and 1b. If an immediately previous signal was at a signal point SP, as shown in FIG. 1a, then the current signal point may be at one of six locations where the phase shift relative to the signal point SP is $\pm\pi/4$ (signal points A, B), $\pm 2\pi/4$ (signal points C, D), $\pm 3\pi/4$ (signal points E, F), or at one of two locations where the Euclidean distance becomes equal to that between signal points E–C and between signal points C–A (namely signal point G) or equal to the Euclidean distance between signal points F–D and between signal points D–B (namely signal point H).

Figure 1B:
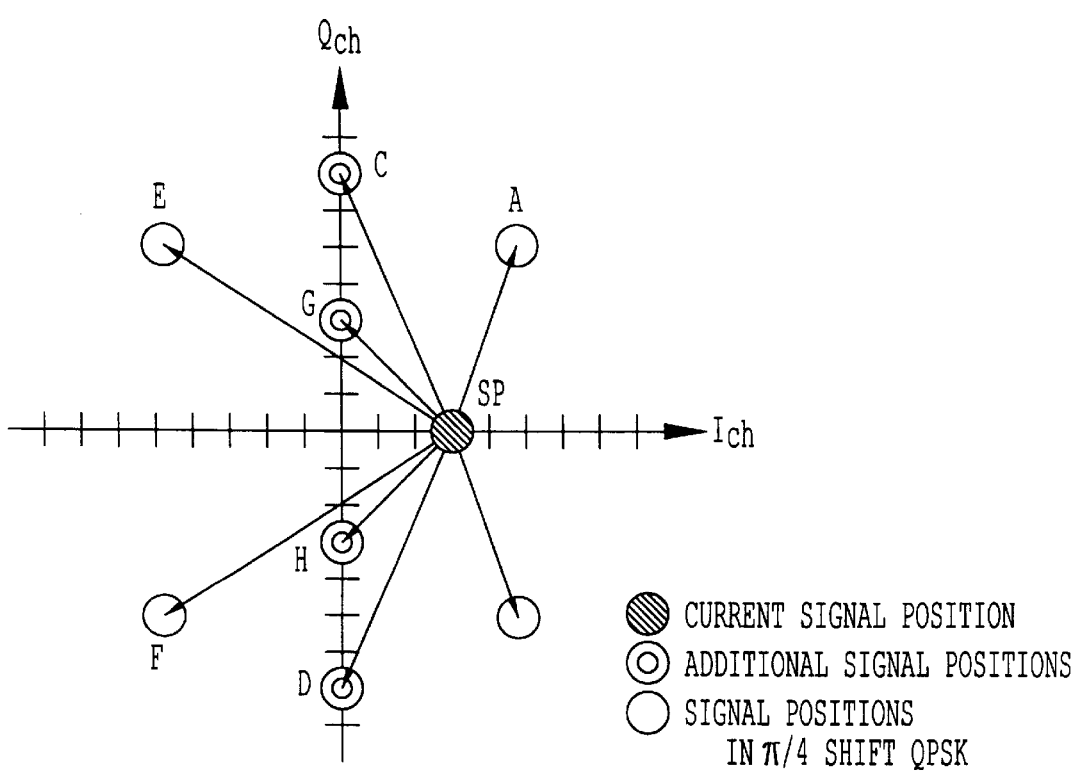

In the case where the immediately previous signal was at a signal point SP', as shown in FIG. 1b, and the ASK signal changed in its amplitude, the possible signal locations at the present symbol time are similar to those shown in FIG. 1a.

That is, in the digital modulation method according to the present embodiment, the signal points are determined so that of those signal points (A–F) where a phase shift equal to $\pm\pi/4$, $\pm 2\pi/4$, or $\pm 3\pi/4$ is allowed while maintaining the amplitude unchanged, amplitude modulation is allowed at only particular signal points (G and H) where a phase shift is equal to $\pm 2\pi/4$. The signal locations according to the present embodiment may also be understood in such a manner that in addition to $\pi/4$-shift QPSK signal points (A, B, E, and F in FIG. 1) where the phase difference between successive symbols is equal to $\pm\pi/4$ or $\pm 3\pi/4$, there are also signal points (C, D, G, and H in FIG. 1) where phase shift is $\pm 2\pi/4$ and the signal behaves as a 2-level ASK signal.

In the present embodiment, since the signal change between successive symbols occurs in the above described manner, the apparent number of signal points is 16. However, the APSK transition allowed at the immediately following symbol time is limited to 8 points. Therefore, in this embodiment, each symbol is represented by 3-bit information.

Symbols are assigned to these eight signal points according to a general rule of the present invention. That is, $2^n$ symbols representing n-bit information are located in a 2-dimensional signal space representing the amplitude and phase, in such a manner that the minimum Euclidean distance between symbols having a "0" at a particular bit and symbols having "1" at the same bit is greater when the particular bit is weighted by a greater factor than when the particular bit is weighted by a smaller factor. More specifically, the signal points shown in FIG. 1 are assigned symbols as follows.

Herein, 3-bit data corresponding to respective symbols are weighted in such a manner that the MSB bit has a highest weight, the LSB bit has a next highest weight, and the second bit (intermediate bit) has a lowest weight.

First, four symbols having a "0" at the LSB are located at signal points A, B, E, and F corresponding to the signal points employed in π/4-shift QPSK at which the phase is equal to ±π/4 or ±3π/4. When these four symbols are located, those symbols having a "0" at the MSB are located at signal points A and E where the phase is equal to π/4 or 3π/4, and symbols having a "1" at the MSB are located at signal points B and F where the phase is equal to −π/4 or −3π/4.

Furthermore, four symbols having a "1" at the LSB are located at signal points where the phase is equal to ±π/2 and where the amplitude has one of 2-level ASK values. When these four symbols are located, those symbols having a "0" at the MSB are located at signal points where the phase has a positive value (equal to π/2) and those symbols having a "1" at the MSB are located at signal points where the phase has a negative value (equal to −π/2).

Of the four symbols having a "1" at the LSB, two symbols are located at signal points C and D, respectively, so that both signal points C and D are on a circle centered at the origin of the signal space and passing through signal points A, B, E, and F where the phase is equal to ±π/4 or ±3π/4. The remaining two symbols are located at signal points G and H so that the Euclidean distance from these points to the signal points having a phase equal to π/4 or 3π/4 or to the signal points having a phase equal to −π/4 or −3π/4 becomes equal to the Euclidean distance from the previous two symbols to the signal point C or D.

Figure 2:
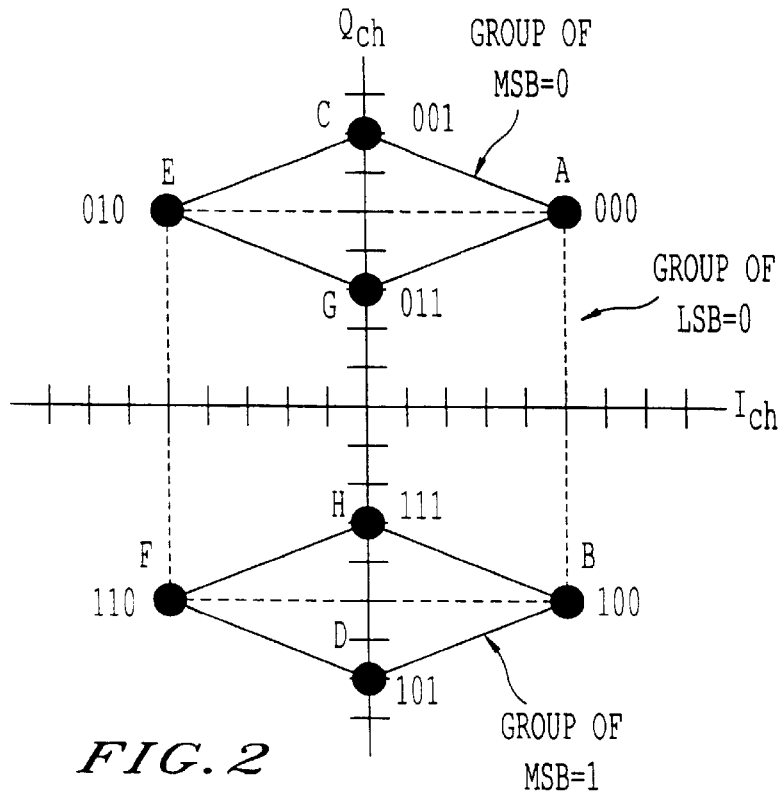
FIG. 2 is a signal space diagram illustrating symbol locations assigned to the respective signal positions used in the digital communication system.

FIG. 2 illustrates the symbol locations determined in the above-described manner. As can be seen from FIG. 2, the minimum Euclidean distance between symbols (at signal points A, C, E, and G) having a "0" at the MSB bit weighted by the greatest factor and symbols (at signal points B, D, F, and H) having a "1" at the MSB bit (such a minimum Euclidean distance occurs between the signal points G and H) is greater than the minimum Euclidean distance between symbols (at signal points A, B, E, and F) having a "0" at the LSB bit weighted by the next greatest factor and symbols (at signal points C, D, G, and H) having a "1" at the LSB bit.

Similarly, the minimum Euclidean distance between symbols having a "0" and symbols having a "1" at the LSB bit is greater than the minimum Euclidean distance between symbols (at signal points A, B, C, and D) having a "0" and symbols (at signal points E, F, G, and H) having a at the second bit weighted by the least factor (such a minimum Euclidean distance occurs between signal points C and G and also between signal points D and H). As a result, in the digital modulation method according to the present embodiment, the minimum Euclidean distances among symbols have the following relationship depending on the weighting factor for each bit:

MSB>LSB>2nd bit (intermediate bit)

In general, the Euclidean distance among symbols is a main factor which causes an increase in the error rate in digital modulation, and thus it is important to make the Euclidean distance as large as possible. In the present embodiment, as shown in FIG. 2, ASK symbols are limited to the two (assigned to signals G and H in FIG. 2) and symbols are located so that the above conditions are satisfied thereby achieving a large enough Euclidean distance among symbols. This makes it possible to perform demodulation with less influence of fading or noise. As a result, high-speed data transmission can be achieved with a simpler receiving circuit. Furthermore, the error rate can be maintained at a low level even when the digital communication device is moving. Still furthermore, by employing the above-described symbol locations determined depending on the weighting factor of each bit, it becomes possible to perform error correction with a shorter length of redundant signal, and a simpler correction process is required at a receiving end, and thus it is also becomes possible to increase the effective transmission rate.

Figure 3:
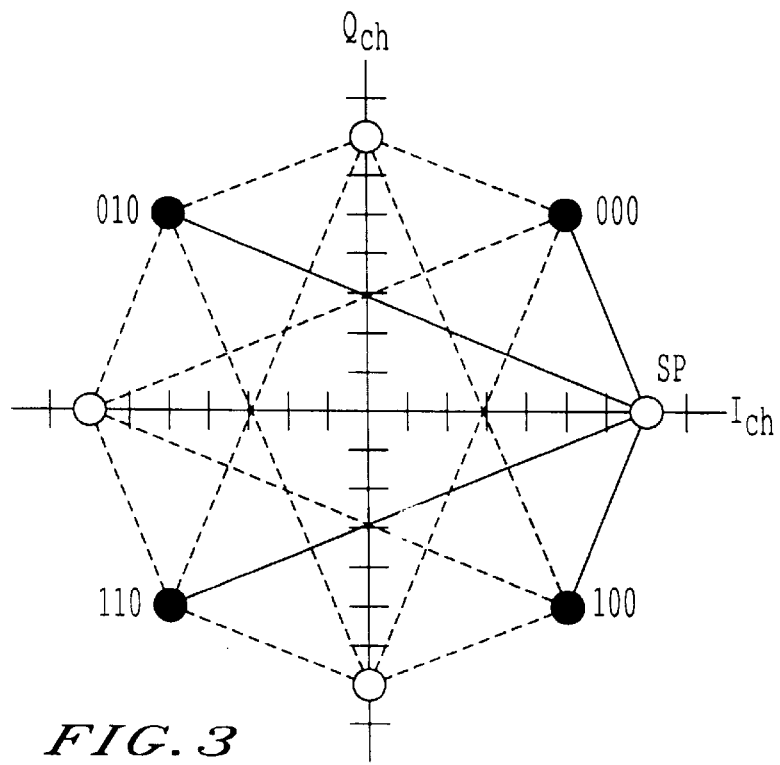
FIG. 3 is a signal space diagram illustrating amplitude phase shifts which are possible when one bit of 3-bit digital data input to the digital communication system is fixed to "0"

In FIG. 2, when the LSB is fixed at "0", of a plurality of groups including symbols having the same value at a particular bit of three bits, namely a group including symbols (signal points) A, C, E, and G (where the MSB is equal to "0"), a group including symbols B, D, F, and H (where the MSB is equal to "1"), a group including symbols A, B, E, and F (where the LSB is equal to "0"), a group including symbols C, D, G, and H (where the LSB is equal to "1"), a group including symbols A, B, C, and D (where the second bit is equal to "0"), and a group including symbols E, F, G, and H (where the second bit is equal to "1"), a group having the smallest Euclidean distance between adjacent symbols (the group including symbols C, D, G, and H, in this example, and the adjacent symbols refers to symbols C and G, and symbols D and H) is inhibited to be located at the signal space, and thus the resultant signal locations become absolutely the same as the signal locations in the π/4-shift QPSK; as shown in FIG. 3.

Thus the digital modulation method according to the present embodiment can be directly employed in any radio communication systems using π/4-shift QPSK according to the conventional technique. Furthermore, in an environment having bad radio wave propagation, as is the case where a communication device is moving or a radio wave is blocked by a building, the operation can be switched from the digital modulation mode according to the present embodiment to the π/4-shift QPSK mode simply by modifying data to be transmitted. Thus, it is possible to achieve high reliability in transmission. In addition, instead of fixing the value only for one bit depending on the location of symbols, a greater number of bits may be fixed so that information is transmitted using only such symbols having a longer Euclidean distance between adjacent symbols. In this case, although a some reduction occurs in the transmission rate, high-reliability transmission is achieved by such a simple modification of transmission data.

The occupied frequency bandwidth required in the digital modulation increases in proportional to the quotient obtained by dividing the transmission rate by the number of bits per symbol and also in proportional to the maximum amplitude phase shift (the movement distance in the polar coordinate system). In the present embodiment, as described above, symbols are located so that the amplitude phase shift for any symbol is smaller than that in the π/4-shift QPSK, and thus a higher transmission rate is achieved while maintaining the occupied bandwidth at a level equal to that required in π/4-shift QPSK.

Figure 4:
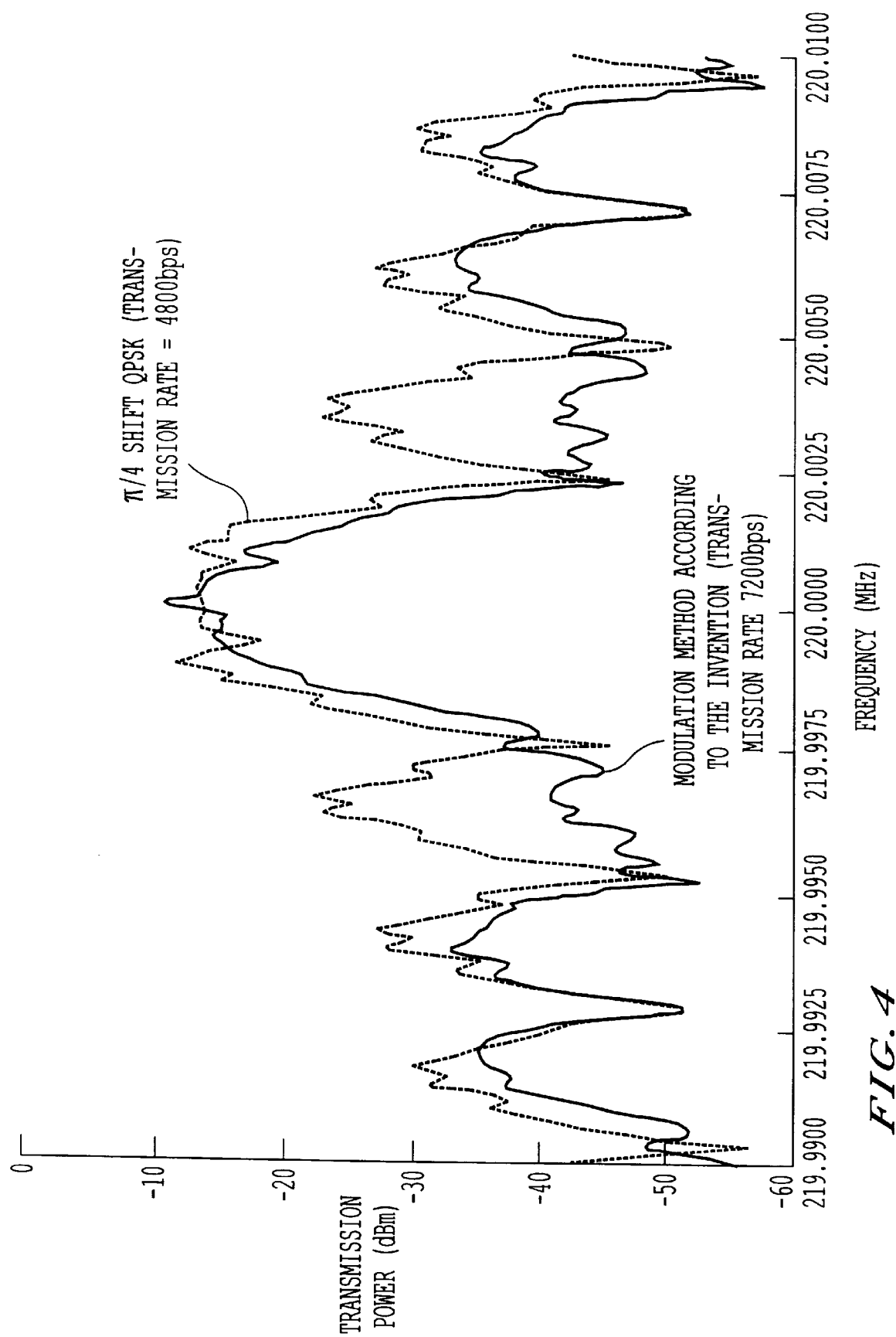
FIG. 4 is a graph illustrating the spectrum obtained in the modulation method according to the present invention and that obtained in the $\pi/4$-shift QPSK technique for the same ratio of the transmission rate to the number of bits per symbol.

FIG. 4 illustrates the spectrum of a modulated signal obtained by π/4-shift QPSK and that obtained by the modulation method according to the present embodiment wherein the quotient of the transmission rate divided by the number of bits per symbol is selected to an equal value for both modulation techniques. As can be seen from this figure, although the occupied bandwidth is similar in both techniques, the transmission rate for the modulation method according to the present embodiment is as high as 7200 bps in contrast to the low transmission rate of 4800 bps obtained in the π/4-shift QPSK technique.

Figure 5:
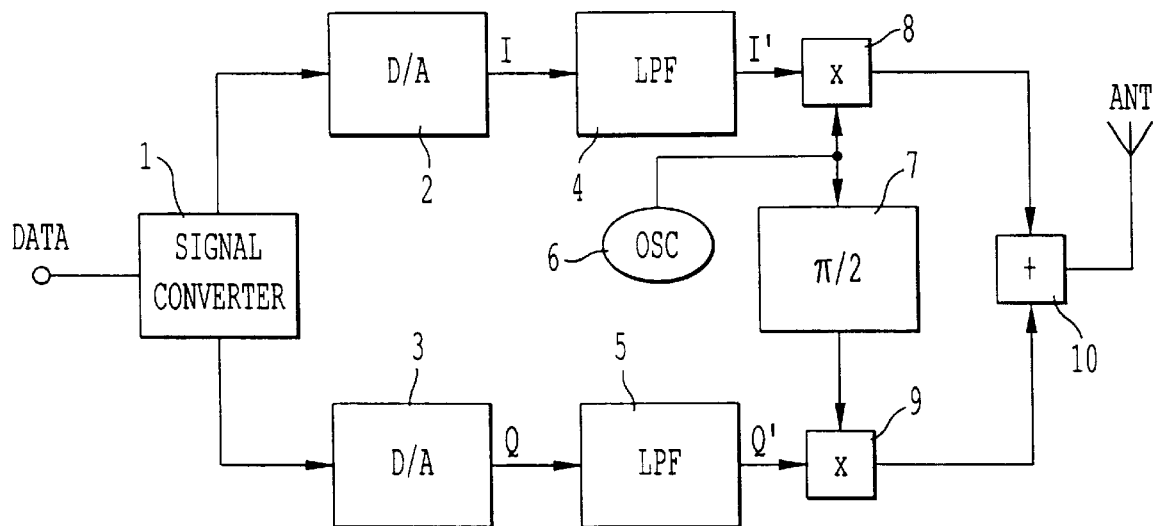
FIG. 5 is a block diagram illustrating the construction of a transmitter used in the digital communication system.
Figure 6:
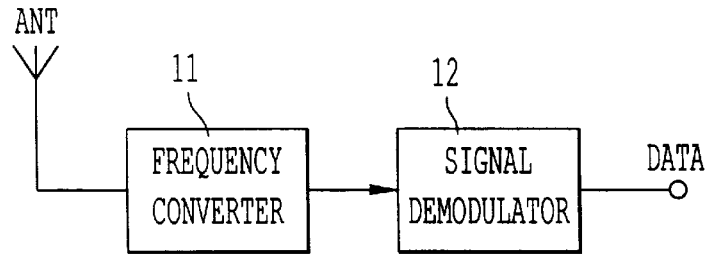
FIG. 6 is a block diagram illustrating the construction of a receiver used in the digital communication system.

FIGS. 5 and 6 are block diagrams illustrating a transmitter and a receiver employing the modulation method described above. FIG. 5 is a block diagram illustrating the transmitter in which modulation is performed according to the method described above. In FIG. 5, reference numeral 1 denotes a signal converter for converting a data stream input bit by bit to 3-bit parallel data at each sampling time thereby generating digital data from which I and Q signals are generated for use in a later process of quadrature amplitude modulation. This signal converter may be realized with a combination of a serial-to-parallel converter and an 8-to-multilevel converter or with a combination of a serial-to-parallel converter and a circuit for reading data from a ROM table. Similarly, the serial-to-parallel converter is used to convert an input data stream to 2-bit parallel data used as the MSB and the second bit of the final 3-bit parallel data wherein the LSB of the 3-bit parallel data is fixed to "0".

In the case where the signal converter 1 is realized using the circuit for reading data from the ROM table, the ROM table includes data representing sixteen I and Q signals corresponding to the respective states of the carrier signal having a phase of 0°, 45°, 90°, 135°, 180°, 225°, 270°, or 315° and having an amplitude equal to 1 (namely equal to the level of the carrier signal) at any of these phases or having an amplitude equal to $2^{1/2}-1$ (namely equal to $(2^{1/2}-1)$ times the level of the carrier signal). For example, if an immediately previous symbol converted by the serial-to-parallel converter to 3-bit parallel data was "010", and if the symbol had a phase of 45° and an amplitude of 1 at its sampling time, then the signal converter 1 reads data for a next symbol for example "000" from the ROM table which corresponds to I and Q signals which give the phase of 90° and the amplitude of 1. The obtained data is output to D/A converters 2 and 3.

Table 1 shows the phase and the amplitude of the modulated signal for various values of the current symbol wherein it is assumed that the immediately previous symbol was "010" and with a phase of 45° and an amplitude of 1 at the sampling time. When a symbol is given, the signal converter 1 outputs proper data, depending on the given symbol, so that the data corresponds to I and Q signals which will produce a modulated signal as shown in Table 1.

TABLE 1

| Symbol | Modulated signal | |
|---|---|---|
| | Phase | Amplitude |
| 000 | 90° | 1 |
| 001 | 135° | 1 |
| 010 | 180° | 1 |
| 011 | 135° | $2^{1/2}-1$ |
| 100 | 0° | 1 |
| 101 | 315° | 1 |
| 110 | 270° | 1 |

TABLE 1-continued

| Symbol | Modulated signal | |
|---|---|---|
| | Phase | Amplitude |
| 111 | 315° | $2^{1/2}-1$ |

If the communication conditions are degraded, the operation mode is switched so that the serial-to-parallel converter performs the conversion process such that the LSB of the 3-bit parallel data to be output is fixed to "0" and the input data stream is converted to a 2-bit parallel data and finally the converted 2-bit parallel data is output as the MSB and second bits of the 3-bit parallel data. In this operation mode, the signal converter 1 outputs data corresponding to I and Q signals which will result in quadrature phase modulation similar to that performed by the conventional π/4-shift QPSK technique in which the final modulated signal will have an amplitude of 1 and a phase equal to ±π/4 or ±3π/4.

The D/A converters 2 and 3 convert the digital data received from the signal converter 1 to analog signals which are output as I and Q signals, respectively. The I and Q signals are applied to low-pass filters 4 and 5, respectively. These low-pass filters are realized with such filters having impulse response characteristics which cause no intersymbol interference. A specific example of such a filter is a Nyquist filter. The low-pass filters 4 and 5 limit the bandwidth of the analog signals output from the D/A converters 2 and 3 within a predetermined range thereby removing high frequency components from the analog signals.

An oscillator 6 generates a signal used as a carrier in the digital communication device according to the present embodiment. The carrier signal output from the oscillator 6 is changed in phase by π/2 by a phase shifter 7. Reference numerals 8 and 9 denote multipliers. The multiplier 8 multiplies the I' signal output from the low-pass filter 4 by the carrier signal output from the oscillator 6. On the other hand, the multiplier 9 multiplies the Q' signal output from the low-pass filter 5 by the carrier signal which was delayed in phase by π/2 through the phase shifter 7. The signals output from the multipliers 8 and 9 are combined by a combiner 10 and the resultant signal is output via an antenna ANT.

Figure 7A:
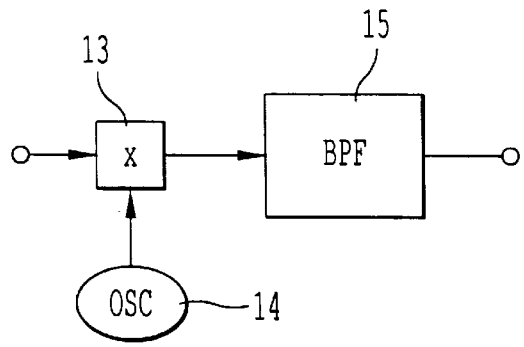

Referring now to FIG. 6, the construction of the receiver used in the digital communication according to the present embodiment will now be described. In FIG. 6, reference numeral 11 denotes a frequency converter comprising, as illustrated in FIG. 7a, a mixer 13, a local oscillator 14, and a bandpass filter 15. In FIG. 6, a signal received via an antenna ANT is applied to the input terminal of the mixer 13 of the frequency converter 11. The mixer 13 multiplies the received signal by the local signal supplied from the local oscillator 14. The resultant signal is applied to the bandpass filter 15 which passes only a component having a frequency equal to the difference between the frequency of the received signal and the frequency of the local signal.

Figure 7B:
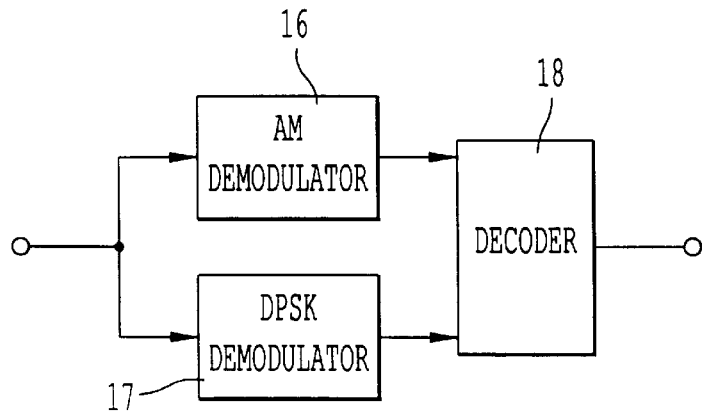

More specifically, the frequency converter shown in FIG. 7a is constructed in the form of a down converter for converting the received signal having a high frequency which is generally difficult to directly deal with to an IF signal having a lower frequency. If it is possible to directly process the signal received via the antenna ANT, then the frequency converter 11 is not necessary. Referring again to FIG. 6, the receiver also includes a signal demodulator 12 comprising, as shown in FIG. 7b, an AM modulator 16, a DPSK demodulator 17, and a decoder 18.

In conventional techniques in which modulation is performed using ASK such as QAM, a receiver performs an operation which is absolutely inverse to the operation performed by the transmitter shown in FIG. 5. In such a technique, in order to obtain a decoded signal from reproduced I and Q signals, it is required that the receiver should include expensive circuits such as a quadrature demodulator and an A/D converter.

However, in the digital modulation method according to the present-embodiment, of signal points (for example signal points A to F in FIG. 2) having a constant signal level and having a phase equal to $\pm\pi/4$, $\pm 2\pi/4$, or $\pm 3\pi/4$, the signal can have a different amplitude only at signal points (G and H) where the phase is equal to $\pm 2\pi/4$, and the amplitude is maintained unchanged at signal points where the phase is equal to $\pm\pi/4$ or $\pm 3\pi/4$ (namely the signal includes no amplitude modulation component at those signal points). In the demodulation process, therefore, the level of the signal having a phase where no amplitude modulation component is included in the signal can be used as a reference level by which the amplitude level is evaluated for such symbols which have been found to have a phase where an amplitude modulation component is included in the signal. This means that the technique according to the present invention requires no preamble signals, which are used in the conventional multilevel digital demodulation technique, as a reference to detect the amplitude component.

Figure 8:
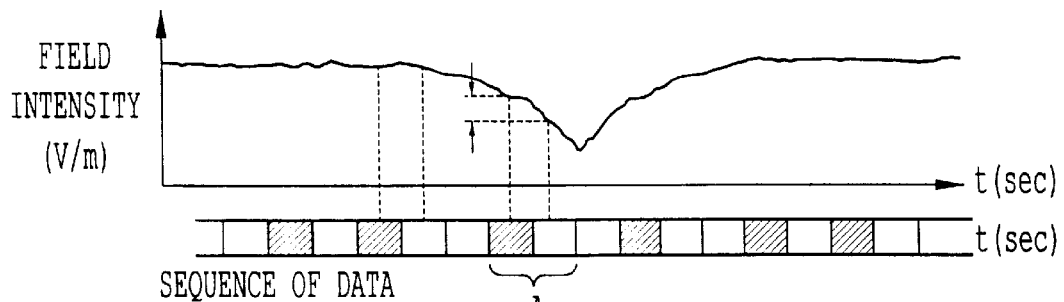
FIG. 8 is a schematic representation of the relationship between the change in electric field due to fading and the signal level employed as a reference level obtained in a sequence of transmitted data.

Furthermore, during the transmission and reception of a series of data, the reference value (denoted by shaded zones in FIG. 8) is updated every symbol interval in the shortest case as shown in FIG. 8. Therefore, even if the intensity of the radio wave includes great fluctuations due to fading or the like, the signal level serving as the reference level can be regarded as being constant during any time period of interest (for example during a period A in FIG. 8). This means that excellent demodulation performance can be achieved in a mobile communication system in which the level of the carrier wave changes from time to time due to fading.

Figure 10A:
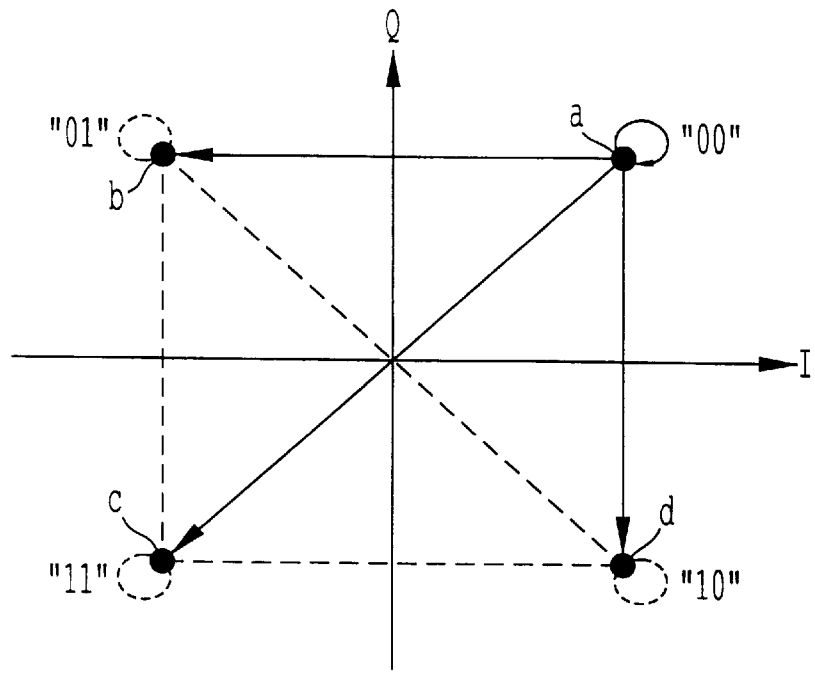
FIGS. 10a and 10b are space diagrams illustrating the signal locations for QPSK and for $\pi/4$-shift QPSK.
Figure 10B:
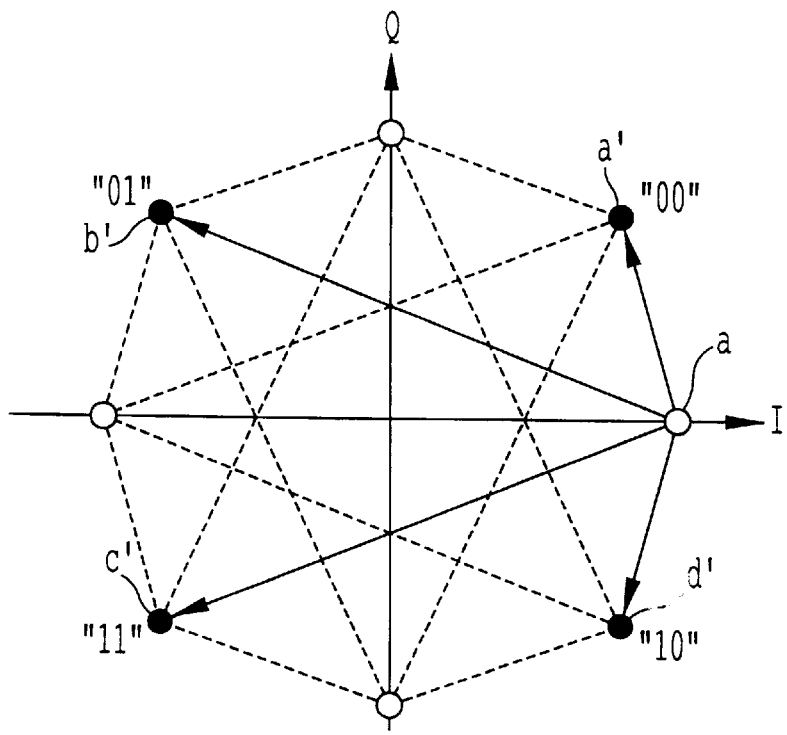
Figure 11:
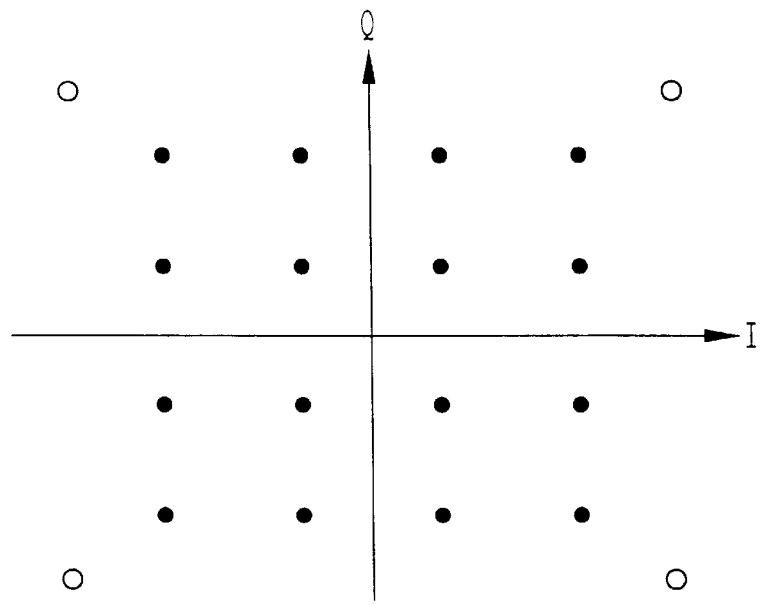
FIG. 11 is a signal space diagram illustrating the signal locations for 16 QAM.
Figure 12:
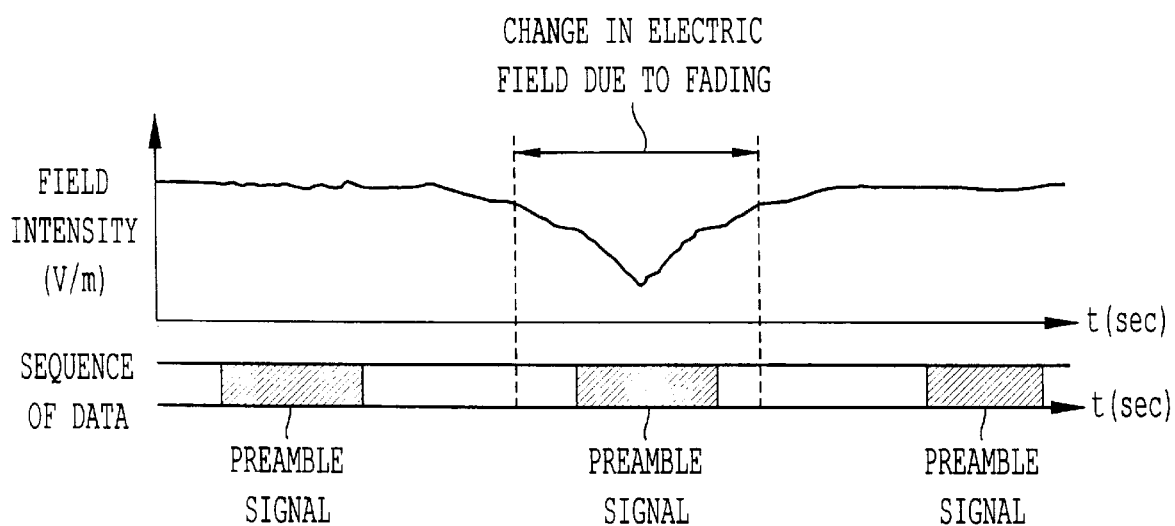
FIG. 12 is a schematic representation of the change in preamble signals included in a sequence of transmitted data to be received by a receiver, wherein such a change can occur due to a change in electric field caused by fading.
Figure 13:
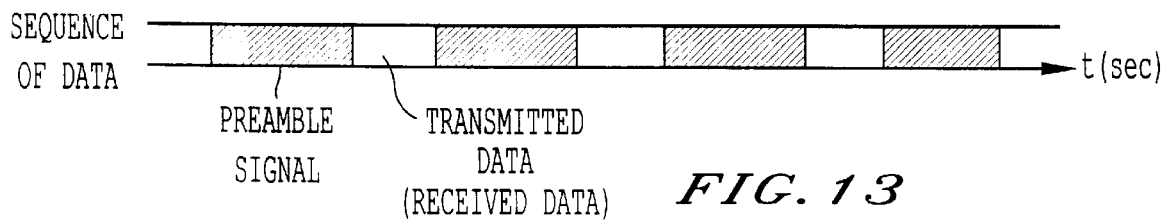
FIG. 13 is a schematic representation of the relationship between the insertion intervals of preamble signals and the amount of data transmitted.

In the specific embodiment described above, the demodulation is performed according to a differential phase shift detection technique in which phase is always shifted. For example, when a set of conventional signal points such as QPSK signal points a–d where the signal has a constant amplitude are given as shown in FIG. 10a, if symbols including an amplitude modulation component are added to those QPSK signal points such that the additional symbols are located at signal points where the phase is equal to either $\pm\pi/4$ or $\pm 3\pi/4$, then it is possible to detect the level of those symbols including the amplitude modulation component by means of using the level of signals at points a–d as a reference. Thus, the technique has at least the advantage that the signal level can be detected without requiring preamble signals.

Figure 9A:
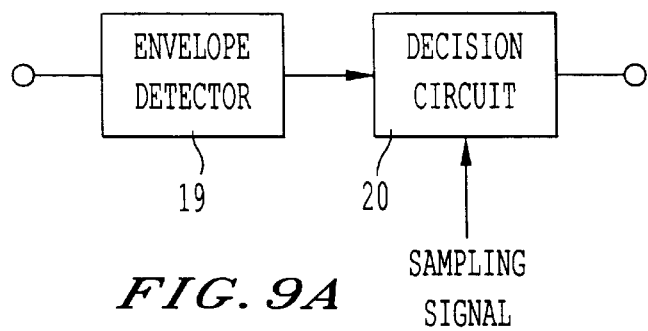

Therefore, in the present embodiment of the invention, the demodulator can be constructed in a simple fashion using an AM demodulator comprising, as shown in FIG. 9a, an envelope detector 19 for detecting the signal level of the modulated signal and a decision circuit 20 for sampling the signal output from the envelope detector 19 at predetermined time intervals in response to an externally supplied sampling signal thereby determining its signal level.

Figure 9B:
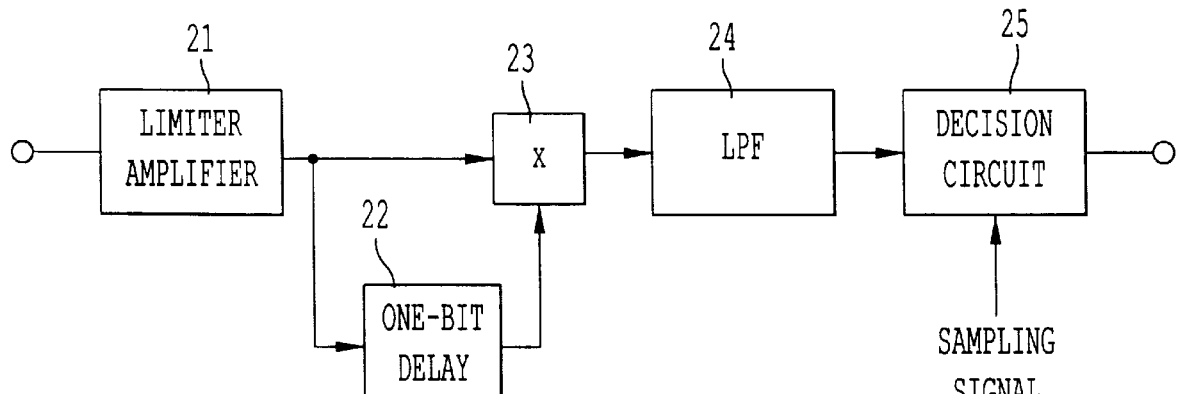

On the other hand, phase detection can be accomplished using the DPSK demodulator of a type widely used. More specifically, the DPSK demodulator 17 of FIG. 7b can be realized, for example, in the form of a delayed detection circuit as shown in FIG. 9b. In this type of DPSK demodulator, the signal output from a limiter amplifier 21 and its one-symbol-time delayed signal obtained through an one-bit delay circuit 22 are complex-multiplied by a mixer 23 thereby obtaining a signal corresponding to a phase difference during one symbol interval. In FIG. 6, a signal is received via an antenna ANT. The received signal is passed through a low-pass filter 24, and its phase difference during one symbol interval is detected by a decision circuit 25 in response to the externally supplied sampling signal.

From the signals output from the AM demodulator 16 and from the DPSK demodulator 17, the decoder 18 obtains decoded digital data. That is, if the output from the DPSK demodulator 17 indicates that the signal has a positive phase, then the MSB is set to "0", while the MSB is set to "1" when the signal has a negative phase. Furthermore, if the phase is equal to either one of $\pm\pi/4$ and $\pm 3\pi/4$, then the LSB is set to "0" and the second bit is set to a value equal to that in $\pi/4$-shift QPSK, depending on the particular phase value. On the other hand, if the phase is not equal to any of $\pm\pi/4$ and $\pm 3\pi/4$, the LSB is set to "1" and the second bit (intermediate bit) is set to a value depending on the output of the AM demodulator 16.

In the digital communication system according to the present embodiment of the invention, as described above, it is possible to use a demodulator which is widely used in conventional techniques and thus receivers can be constructed in a simple fashion at low cost.

In the present invention, the decoder 18 shown in FIG. 7b also has the following advantages as will now be described. When a digital signal is transmitted according to a conventional technique, if the signal is encoded based on, for example, the BCH coding technique, such that errors which occur during the transmission can be corrected, a 3-bit error correction code is required for each 4-bit information data, wherein the addition of such an error correction code results in an increase in redundancy. When all bits are transmitted in exactly the same manner, it is required that the error correction code be added such that any bit can be corrected. However, in the digital modulation method according to the present embodiment of the invention, symbols are located depending on the weighting factor associated with the respective bits and therefore all bits are not transmitted under the same conditions (the Euclidean distance in this case). Thus, it is possible to change the redundancy associated with the error correction process depending on the bit weighted by a particular factor. This means that the decoder 18 requires less processing capability and the redundant signal can be reduced. As a result, it is possible to transmit a greater amount information with a simpler system.

The serial-to-parallel converter in the signal converter 1 shown in FIG. 5 has the capability of fixing the LSB at "0" and converting the input data stream to a 2-bit parallel data and then outputting the resultant 2-bit data as the MSB and the second bit of the 3-bit parallel data. The serial-to-parallel converter may also have the capability of fixing a bit other than the LSB at "0"or "1" depending on the symbol location thereby preventing the symbols, included in the group having the smallest Euclidean distance among adjacent symbols, from being located in the signal space.

Alternatively, in the serial-to-parallel converter, a greater number of bits may be fixed to particular values so that digital modulation is performed using only symbols having a greater Euclidean distance among adjacent symbols. In this case, although a reduction in the transmission rate occurs, high-reliability transmission is achieved by performing such a simple modification.

In the present invention, as described above, digital modulation is performed in such a manner that, of signal points where phase is shifted while maintaining the amplitude constant, amplitude modulation is allowed at some particular signal points. The signal level of the symbols having only a phase modulation component and having no amplitude modulation component is employed as a reference level to detect the level of symbols having a phase at which an amplitude modulation component is also included. This technique makes it possible to detect the signal level without needing preamble signals which are employed in the conventional multilevel digital modulation techniques to detect the signal level. Furthermore, it becomes possible to achieve high performance in demodulation even in a bad environment in which the level of the carrier wave changes from time to time due to fading.

Furthermore, since $2^n$ symbols representing n-bit information are located in the two-dimensional signal space representing the amplitude and phase in such a manner that the minimum Euclidean distance between symbols having a "0" at a particular bit and symbols having "1" at the same bit is greater when the particular bit is weighted by a greater factor than when the particular bit is weighted by a smaller factor, it becomes possible to make error correction using a smaller length error correction code. Furthermore, it is possible to perform error correction at a receiving end in a simple fashion. Still furthermore, the effective transmission rate can be improved.

Furthermore, of a plurality of groups including symbols having equal value at a particular one bit of the n bits, such a group having the smallest Euclidean distance among adjacent symbols is inhibited to be used depending on the degree of degradation in the communication quality due to noise, fading, reduction in the intensity of electric field, or the like, and information is transmitted using n−1 bits; and depending on the degree of degradation in the communication quality, the above process is performed repeatedly for the remaining symbols except for the symbols inhibited to be used, thereby transmitting n−k bit information (wherein k is an integer greater than 1 and smaller than n). This makes it possible to increase the Euclidean distance among symbols used in transmission even when degradation occurs the communication quality, and thus higher reliability is achieved in communication.

When n is equal to 3, the symbols used are located at any of six signal points where the phase shift is equal to $\pm\pi/4$, $\pm 2\pi/4$, or $\pm 3\pi/4$ and the amplitude is equal to the first level or at either one of two signal points where the phase shift is equal to $\pm 2\pi/4$ and the amplitude is equal to the second level lower than the first level. Thus, transitions occur without passing through the origin of the signal space as in the case of $\pi/4$-shift QPSK, and therefore the dynamic range of the signal is maintained within a narrow range. This allows the power amplification to be performed using a simple amplifier without needing a high-performance linear amplifier. Therefore, it is possible to realize a transmitter having a high power efficiency with a simple circuit.

Furthermore, since the ASK symbols are limited to the two where there is a phase difference equal to $\pi$, it is possible to easily perform detection in the demodulation process, and thus it is possible to realize a receiver with a simple circuit. Because the amplitude phase shift is equal to or smaller than that in $\pi/4$-shift QPSK, it is possible to increase the number of bits per symbol by one although the occupied bandwidth is similar. This means that data can be transmitted at a transmission rate about 1.5 times greater than is achieved in the $\pi/4$-shift QPSK using a similar bandwidth.

The respective bits of the 3-bit digital data located at the eight signal points described above are weighted in such a manner that the first bit is weighted differently depending on whether the signal point is included in the $\pi/4$-shift QPSK, and the second and third bits located at such signal points included in the $\pi/4$-shift QPSK are weighted in the same manner as in the $\pi/4$-shift QPSK. This means that if an arbitrary one bit is fixed, then the resultant signal locations become the same as those in the $\pi/4$-shift QPSK. Therefore, it is possible to employ the method and device according to the present invention in radio communication systems based on the conventional $\pi/4$-shift QPSK technique. Furthermore, in a bad environment in terms of the radio wave propagation, it is possible to switch the operation mode from the digital modulation according to the present invention to an operation mode based on the conventional $\pi/4$-shift QPSK technique so that high reliability is achieved in communication.

The above switching in the operation mode can be accomplished simply by fixing a predetermined bit of the 3-bit data at a particular value. Therefore, the switching capability can be realized with a simple circuit. Furthermore, because the Euclidean distance among symbols is maintained large enough, less influence of noise and fading is encountered in the receiving operation compared to multilevel QAM, and thus it is possible to receive data in a highly reliable fashion even in mobile communication.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Digital modulation and demodulation methods based on amplitude phase shift keying, said digital modulation method comprising the steps of:

generating first signal points having symbols represented by a digital signal including a phase modulation component and a constant amplitude; and generating second signal points by adding an amplitude modulation component to the phase modulation component of at least one of the first signal points;

said digital demodulation method for demodulating a modulated signal obtained by the digital modulation method, said digital demodulation method comprising the steps of:

receiving said modulated signal; and setting a reference level based on an amplitude level of symbols including only a phase modulation component and having no amplitude modulation component to determine an amplitude level for such symbols also included in the modulated signal and having a phase to which an amplitude modulation component is added.

2. A digital modulation method based on amplitude phase shift keying, for modulating a carrier signal based on n-bit information (where n is an integer equal to or greater than 3), said method comprising the steps of:

representing said n-bit information with $2^n$ symbols, locating said $2^n$ symbols in a two-dimensional signal space representing an amplitude and a phase of said $2^n$ symbols in such a manner that a minimum Euclidean distance between signal points where symbols have a logic "0" at a certain bit location and signal points where symbols have a logic "1" at the same bit location has a greater value when said bit location is weighted by a greater factor than when said bit location is weighted by a smaller factor.

3. The digital modulation method according to claim 2, further comprising the steps of:

inhibiting use of symbols, including symbols having an equal value at a particular bit of said n bits, and having a smallest Euclidean distance among adjacent symbols, depending on a degree of degradation in communication quality due to one of noise, fading, and reduction in intensity of electric field, and transmitting said information using n−1 bits; and repeating said inhibiting step depending on the degree of degradation in the communication quality, for the remaining symbols except for the inhibited symbols thereby transmitting n−k bit information (wherein k is an integer greater than 1 and smaller than n).

4. The digital modulation method according to claim 2, wherein the value of n is equal to 3 and further comprising the steps of:

locating a symbol at any given time at a symbol position selected from the group consisting of:

a first symbol position having a phase different by $+\pi/4$ relative to that of the symbol position at one symbol previous time and having an amplitude equal to a first level;

a second symbol position having a phase different by $-\pi/4$ relative to that of the symbol position at one symbol previous time and having an amplitude equal to the first level;

a third symbol position having a phase different by $+3\pi/4$ relative to that of the symbol position at one symbol previous time and having an amplitude equal to the first level;

a fourth symbol position having a phase different by $-3\pi/4$ relative to that of the symbol position at one symbol previous time and having an amplitude equal to the first level;

a fifth symbol position having a phase different by $+2\pi/4$ relative to that of the symbol position at one symbol previous time and having an amplitude equal to the first level;

a sixth symbol position having a phase different by $-2\pi/4$ relative to that of the symbol position at one symbol previous time and having an amplitude equal to the first level;

a seventh symbol position having a phase different by $+2\pi/4$ relative to that of the symbol position at one symbol previous time and having an amplitude equal to a second level lower than the first level; and an eighth symbol position having a phase different by $-2\pi/4$ relative to that of the symbol position at one symbol previous time and having an amplitude equal to the second level.

5. The digital modulation method according to claim 4, wherein said second level is determined so that a Euclidean distance from the seventh symbol position to the first and third symbol positions and a Euclidean distance from the eighth symbol position to the second and fourth symbol positions are equal to a Euclidean distance from the fifth symbol position to the first and third symbol positions and a Euclidean distance from the sixth symbol position to the second and fourth symbol positions, respectively.

6. A digital modulation device for transmitting and receiving digital data by performing discrete amplitude phase shift keying modulation and demodulation on a carrier signal in accordance with successively input digital data comprising n-bit information (where n is an integer equal to or greater than 3), said device comprising:

conversion means for representing said n-bit information with $2^n$ symbols;

modulation means for locating said $2^n$ symbols in a two-dimensional signal space representing an amplitude and a phase of said $2^n$ symbols in such a manner that a minimum Euclidean distance between signal points where symbols have a logic "0" at a certain bit location and signal points where symbols have a logic "1" at the same bit location has a greater value when said bit location is weighted by a greater factor than when said bit location is weighted by a smaller factor.

7. The digital communication device according to claim 6, wherein n=3 and said conversion means converts said digital data to 3-bit parallel data; and said modulation means changes a phase and an amplitude of the modulated carrier signal at a given time according to the 3-bit parallel data produced by said conversion means, in such a manner that said phase and amplitude are in one of states selected from the group consisting of:

a first state having a phase different by $+\pi/4$ relative to that in a state at one symbol previous time and having an amplitude equal to a first level;

a second state having a phase different by $-\pi/4$ relative to that in the state at one symbol previous time and having an amplitude equal to a first level;

a third state having a phase different by $+3\pi/4$ relative to that in the state at one symbol previous time and having an amplitude equal to a first level;

a fourth state having a phase different by $-3\pi/4$ relative to that in the state at one symbol previous time and having an amplitude equal to a first level;

a fifth state having a phase different by $+2\pi/4$ relative to that in the state at one symbol previous time and having an amplitude equal to a first level;

a sixth state having a phase different by $-2\pi/4$ relative to that in the state at one symbol previous time and having an amplitude equal to a first level;

a seventh state having a phase different by $+2\pi/4$ relative to that in the state at one symbol previous time and having an amplitude equal to a second level lower than the first level; and an eighth state having a phase different by $-2\pi/4$ relative to that in the state at one symbol previous time and having an amplitude equal to the second level.

8. The digital communication device according to claim 7, wherein said conversion means fixes a particular bit of said 3-bit parallel data, to be output, at a particular value so that said modulated carrier signal is always in either one of said first to fourth states depending on the degree of degradation in communication quality due to one of noise, fading, and reduction in intensity of electric field, and converts successively-input digital data to 2-bit parallel data and then combines said 2-bit parallel data with said particular bit fixed to said particular value as said 3-bit parallel data, and outputs said 3-bit parallel data.

9. The device according to claim 8, wherein said conversion means fixes a particular bit of said 3-bit parallel data, to be output, at a particular value so that said modulated carrier signal is always in either the first or fourth state, or in either the second or third state, or in either the fifth or sixth state, depending on a degree of degradation in communication quality due to one of noise, fading, reduction in intensity of electric field, fixes a particular bit of the remaining two bits at a particular value, and converts successively-input digital data to 1-bit data and then combines said 1-bit data with said particular two bits fixed to said particular values as said 3-bit parallel data, and outputs said 3-bit parallel data.

10. The digital communication device according to claim 7, wherein said modulation means comprises:

carrier signal generation means for generating a carrier signal;

storage means for storing information representing the a phase difference of a current modulated signal relative to a phase of the carrier signal;

phase amplitude indication means for selecting one of said first to eighth states in accordance with values of respective bits of the 3-bit parallel data output from said conversion means, and for determining the phase difference of the modulated signal relative to the phase of said carrier signal from the phase change in said selected state and from the information stored in said storage means, and for indicating said phase difference determined and the amplitude in said selected state;

information updating means for updating the information about the phase difference stored in said storage means with the phase difference indicated by said phase amplitude indication means; and phase amplitude control means for controlling the phase and the amplitude of said carrier signal so that said phase and amplitude of the carrier signal has a phase difference and an amplitude equal to the phase difference and the amplitude indicated by said phase amplitude indication means.

11. The digital communication device according to claim 10, wherein said phase amplitude indication means performs:

a first selection for selecting either a group including said first, third, fifth and seventh states or a group including said second, fourth, sixth and eighth states, in accordance with the value of a predetermined bit of three bits of the 3-bit parallel data output from said conversion means;

a second selection for selecting, after said first selection, in accordance with the value of a predetermined bit of the remaining two bits of the three bits in such a manner that if the group including the first, third, fifth, and seventh states is selected in said first selection then either a group including the first and third states or a group including the fifth and seventh states is selected in said second selection, while either a group including the second and fourth states or a group including the sixth and eighth states is selected in said second selection if the group including the second, fourth, sixth, and eighth states is selected in said first selection; and a third selection for selecting, after said second selection, either one of the two states included in the group selected in said second selection in accordance with the value of the remaining one bit of the three bits.

12. The digital communication device according to claim 11, wherein if the amplitude indicated by said phase amplitude indication means is the first level then said phase amplitude control means controls an amplitude of the modulated signal so that it becomes equal to a level of said carrier signal, while said phase amplitude control means controls the amplitude of the modulated signal so that it becomes equal to a value 2½−1 times the amplitude of said carrier signal if the amplitude indicated by said phase amplitude indication means is the second level.

13. The digital communication device according to claim 7, further comprising:

receiving means for receiving the modulated signal output from said modulation means;

detection means for performing envelope detection on the modulated signal received via said receiving means;

phase difference detection means for detecting a phase difference between successive symbols; and demodulation means for demodulating the modulated signal into 3-bit digital data in accordance with a level of detected signal output from said detection means and the phase difference detected by said phase difference detection means, wherein said demodulation means determines:

the value of one bit of said three bits depending on whether the phase difference detected by said phase difference detection means is positive or negative;

the value of one bit of the remaining two bits depending on whether the phase difference detected by said phase difference detection means is equal to any one of $\pm\pi/4$ and $\pm 3\pi/4$; and the value of the remaining one bit in such a manner that if the phase difference detected by said phase difference detection means is equal to any one of $\pm\pi/4$ and $\pm 3\pi/4$, said value of the remaining one bit is determined in accordance with the phase difference, while said value of the remaining one bit is determined in accordance with the detection result of said detection means in the case where the phase difference detected by said phase difference detection means is not equal to any one of $\pm\pi/4$ and $\pm 3\pi/4$.

* * * * *